(12) United States Patent
Suo et al.

(10) Patent No.: US 9,538,533 B2
(45) Date of Patent: Jan. 3, 2017

(54) METHOD AND DEVICE FOR RESOURCE ALLOCATION

(75) Inventors: Shiqiang Suo, Beijing (CN); Jiaojiao Liu, Beijing (CN)

(73) Assignee: DATANG MOBILE COMMUNICATIONS EQUIPMENT CO., LTD, Beijing (CN)

( * ) Notice: Subject to any disclaimer, the term of this patent is extended or adjusted under 35 U.S.C. 154(b) by 210 days.

(21) Appl. No.: 13/885,342

(22) PCT Filed: Nov. 15, 2011

(86) PCT No.: PCT/CN2011/082198
§ 371 (c)(1),
(2), (4) Date: May 31, 2013

(87) PCT Pub. No.: WO2012/065538
PCT Pub. Date: May 24, 2012

(65) Prior Publication Data
US 2013/0235837 A1    Sep. 12, 2013

(30) Foreign Application Priority Data

Nov. 15, 2010 (CN) .......................... 2010 1 0546149

(51) Int. Cl.
H04W 72/04 (2009.01)
H04L 5/00 (2006.01)
H04L 27/26 (2006.01)

(52) U.S. Cl.
CPC ........ H04W 72/0453 (2013.01); H04L 5/0062 (2013.01); H04L 5/0044 (2013.01); H04L 27/26 (2013.01)

(58) Field of Classification Search
None
See application file for complete search history.

(56) References Cited

U.S. PATENT DOCUMENTS

2009/0201867 A1* 8/2009 Teo .................. H04L 5/0037
                                                          370/329
2010/0151876 A1* 6/2010 Park et al. ............... 455/452.2
(Continued)

FOREIGN PATENT DOCUMENTS

CN          1885752         12/2006
CN          1953437          4/2007
(Continued)

OTHER PUBLICATIONS

Al-Shalash et al., Interference Constrained Soft Frequency Reuse for Uplink ICIC in LTE Networks, 2010 IEEE 21st International Symposium on Personal Indoor and Mobile Radio Communications (PIMRC), Sep. 26, 2010, pp. 1882-1887, Piscataway, NJ, USA (6 pages).

(Continued)

*Primary Examiner* — Huy D Vu
*Assistant Examiner* — Hong Shao
(74) *Attorney, Agent, or Firm* — Foley & Lardner LLP; James F. Ewing; Paul M. H. Pua

(57) ABSTRACT

The embodiment of the present invention relates to the technical field of wireless communication, and particularly to a method and a device for resource allocation, which are used to solve the problem existing in the prior art that, when an inter-neighborhood interference coordination method is used to reduce interference, it often results in a low resource utilization rate in neighborhoods or a limitation on the transmission power, which wastes the hardware resources in a base station and increases power consumption. The method in the embodiment of the present invention comprises: at least two frequency sub-bands are determined in a carrier bandwidth, wherein the central frequencies of frequency sub-bands are different, and there is an overlapping area in the frequency domain between at least two frequency sub-bands from all frequency sub-bands; the determined frequency sub-bands are allocated to individual neighbor- (Continued)

hoods in a deployment area, and the frequency sub-band allocated to a neighborhood is used as the system bandwidth of that neighborhood. By using the method in the embodiment of the present invention, the inter-neighborhood interference in common uplink channels and common downlink channels is decreased effectively, and thus the limitation on transmission power in those neighborhoods is reduced, which increases the available signal transmission power in the neighborhoods to a certain extent and at the same time reduces the hardware costs of the base station and power consumption, without increasing the costs for network deployment.

16 Claims, 8 Drawing Sheets

(56) References Cited

U.S. PATENT DOCUMENTS

| | | | | |
|---|---|---|---|---|
| 2010/0317364 | A1* | 12/2010 | Zhang et al. | 455/452.2 |
| 2011/0096717 | A1* | 4/2011 | Kim et al. | 370/315 |
| 2011/0201341 | A1* | 8/2011 | Choudhury et al. | 455/450 |
| 2012/0106472 | A1* | 5/2012 | Rosa et al. | 370/329 |

FOREIGN PATENT DOCUMENTS

| | | |
|---|---|---|
| CN | 101094213 | 12/2007 |
| CN | 101572683 | 11/2009 |
| WO | WO-2010/112065 | 10/2010 |

OTHER PUBLICATIONS

Chang et al., A Graph Approach to Dynamic Fractional Frequency Reuse (FFR) in Multi-Cell OFDMA Networks, 2009 IEEE International Conference on Communications, Jun. 1, 2009, pp. 1-6 (6 pages).

Extended European Search Report for EPO Appl. Ser. No. 11841326.9 dated Apr. 11, 2014 (7 pages).

Fraimis et al., A Distributed Radio Resource Allocation Algorithm with Interference Coordination for Multi-cell OFDMA Systems, 2010 IEEE 21st International Symposium on Personal Indoor and Mobile Radio Communications (PIMRC), Sep. 26, 2010, pp. 1354-1359, Piscataway, NJ, USA (6 pages).

International Search Report for PCT/CN2011/082198 dated Mar. 1, 2012.

* cited by examiner

METHOD AND DEVICE FOR RESOURCE ALLOCATION

This application is a US National Stage of International Application No. PCT/CN2011/082198, filed on 15 Nov. 2011, designating the United States, and claiming priority from Chinese Patent Application No. 201010546149.1, filed with the Chinese Patent Office on Nov. 15, 2010 and entitled "Method and Device for Resource Allocation." The contents of the foregoing applications are hereby incorporated herein by reference in their entireties.

FIELD OF THE INVENTION

The present invention relates to the technical field of wireless communication and particularly to a method and device for resource allocation.

BACKGROUND OF THE INVENTION

For a Long Term Evolution (LTE) system, interference in the system primarily results from inter-cell same-frequency interference. A general method for lowering inter-cell interference is to obviate interference by using an inter-cell interference coordination method. A general principle thereof is to limit the use of resources in an inter-cell coordination way, where available time and frequency resources are limited or transmission power is limited over specific time and frequency resources. A simple implementation method is to perform static inter-cell interference coordination, as illustrated in FIG. 1, in which there are two schemes:

In the first scheme, the entire system bandwidth is divided into four segments, where only one of three sub-bands A is available to each cell at the edge of adjacent cells, and only sub-band B is available at the center of the cell. It can be seen that at this time the entire system bandwidth can not actually be used by any cell for working, that is, for any cell, there are idle sub-bands in which no signal can be transmitted, but hardware devices of the cell still support the cell to work throughout the system bandwidth (i.e., 3A+B), thus resulting in costs of the hardware devices and useless power consumption.

In the second scheme, the entire system bandwidth is divided into three segments, where only one of three sub-bands A is available to each cell at the edge of adjacent cells, and only the entire system bandwidth is available at the center of the cell. However at this time, transmission power at the center of the cell need be lowered in order to alleviate interference of a user at the center of the cell to another user outside the cell. It can be seen that although at this time the entire frequency band can be used by any cell for working, transmission at full power can not be performed, thus reducing power amplification efficiency.

The foregoing inter-cell interference coordination schemes are applicable only to physical downlink shared channels and physical uplink shared channels, and for broadcast channels, synchronization channels, control channels and other common channels in LTE, since their occupied time and frequency resources are relatively fixed, interference can not be obviated by the simple resource coordination way. Moreover, although the existing inter-cell interference coordination schemes can lower inter-cell interference of shared channels effectively, they can not be applicable to transmission of broadcast, synchronization, control channels and other common channels; and when applied to shared channels, there are problems of wasting hardware resources in a base station and increasing useless power consumption. Furthermore, costs of network deployment are also increased.

In summary, lowering interference in the inter-cell interference coordination schemes at present typically results in a low resource utilization rate of the cell or a limitation on the transmission power, and consequently a waste of hardware resources in the base station and an increase in power consumption.

SUMMARY OF THE INVENTION

Embodiments of the invention provide a method and device for resource allocation, so as to address the problems in the prior art that lowering interference in the inter-cell interference coordination schemes typically results in the low resource utilization rate of the cell or the limitation on the transmission power and consequently the waste of hardware resources in the base station and the increase in the power consumption.

An embodiment of the invention provides a method for resource allocation, which includes:

determining at least two sub-bands in a carrier bandwidth, wherein central frequency points of respective sub-bands are different, and there is an overlapping area in a frequency domain between at least two sub-bands of all sub-bands; and allocating the determined sub-bands to respective cells in a deployment region.

An embodiment of the invention provides a device for resource allocation, which includes:

a determining module configured to determine at least two sub-bands in a carrier bandwidth, wherein central frequency points of respective sub-bands are different, and there is an overlapping area in a frequency domain between at least two sub-bands of all sub-bands; and an allocating module configured to allocate the determined sub-bands to respective cells in a deployment region.

Since the central frequency points of respective determined sub-bands are different and there is an overlapping area in the frequency domain between at least two sub-bands of all the sub-bands, inter-cell interference in uplink and downlink common channels can be lowered effectively, to thereby alleviate the limitation on transmission power of a cell, improve to some extent the available transmission power of a signal for the cell and also lower hardware costs of the base station and power consumption; and furthermore, costs of network deployment can not be increased.

DETAILED DESCRIPTION OF THE EMBODIMENTS

In the embodiments of the invention, at least two sub-bands are determined in a carrier bandwidth, where central frequency points of respective sub-bands are different, there is an overlapping area in the frequency domain between at least two sub-bands of all the sub-bands, and the sum of the bandwidth of the overlapping area and the bandwidth of a non-overlapping area is no larger than the carrier bandwidth. The so-called carrier bandwidth refers to the entire bandwidth available to an operator. Since the central frequency points of respective determined sub-bands are different, there is the overlapping area in the frequency domain between at least two sub-bands of all the sub-bands, and the sum of the bandwidth of the overlapping area and the bandwidth of the non-overlapping area is no larger than the carrier bandwidth, inter-cell interference in uplink and downlink common channels can be lowered effectively, to thereby alleviate the limitation on transmission power of a cell, improve to some extent the available transmission power of a signal for the cell and also lower hardware costs of the base station and power consumption; and furthermore, costs of network deployment can not be increased.

Particularly, the embodiments of the invention can be applied to a TD-LTE system, and can also be applied to an LTE-Frequency Division Duplex (FDD) system, an LTE-Advance system and the like.

Figure 4:
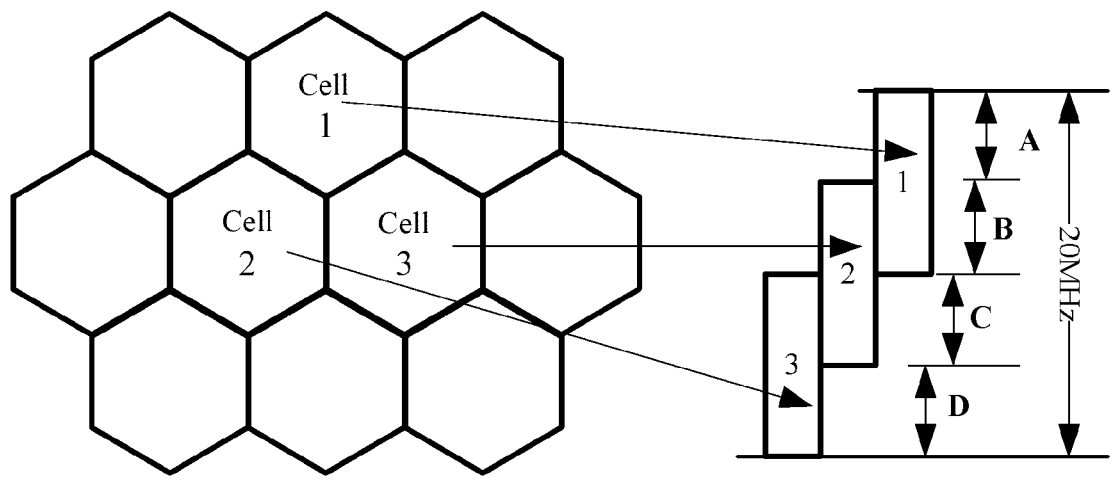
FIG. 4 is a schematic diagram of allocation of sub-bands according to an embodiment of the invention.

Preferably, the embodiments of the invention perform network deployment using a base station device in support of a smaller system bandwidth, for example, the carrier bandwidth is 20 MHz, while the system bandwidth supported by the base station device is 10 MHz, and thus adjacent cells should have their central frequency points skipped and have a specific overlapping width which is set as required. As illustrated in FIG. 4 and by way of an example where a cell is deployed as three sectors together with a carrier bandwidth of 20 MHz and a system bandwidth of a base station device of 10 MHz, it can be seen that different cells are subject to lowered interference as compared with the network deployment using a base station device with a system bandwidth of 20 MHz uniformly.

For the cell 1, in the frequency band A, interference is lowered to ⅓ of that under the condition of same-frequency networking (that is, all of three cells support the system bandwidth of 20 MHz and their central frequency points coincide); and in the frequency band B, interference is lowered to ⅔ of that under the condition of same-frequency networking.

Taking the frequency band A as an example, it is assumed that there are further cells 4, 5 and 6 present, where sub-bands allocated to the cell 4 is the frequency bands A+B, sub-bands allocated to the cell 5 is the frequency bands B+C, and sub-bands allocated to the cell 6 is the frequency bands C+D, and then for the cell 4, since each cell uses a bandwidth of 20 MHz in the same-frequency networking scheme, that is, the frequency band A is available to each of the cell 1, the cell 2 and the cell 3, the cell 4 will be subject to interference from the cell 1, the cell 2 and the cell 3 in the frequency band A, while with sub-bands offset from each other, the frequency band A is only available to the cell 1, and there is no interference from the cell 2 and the cell 3 in the frequency band A, thus lowering interference to ⅓ of original interference, where the lowering factor is just a relative value because interference particularly further depends upon other factors, e.g., environment, hardware, etc., but the purpose of lowering interference has been achieved as compared with the same-frequency networking scheme. Similarly, since the frequency band B is available to both the cell 1 and the cell 2 but not available to the cell 3, interference of the frequency band B is lowered to ⅔ of that in the same-frequency networking scheme; and the lowering hereinafter is determined in this way, so a repeated description thereof will be omitted later.

For the cell 2, in the frequency band C, interference is lowered to ⅔ of that under the condition of same-frequency networking; and in the frequency band D, interference is lowered to ⅓ of that under the condition of same-frequency networking.

For the cell 3, in the frequency band B, interference is lowered to ⅔ of that under the condition of same-frequency networking; and in the frequency band C, interference is lowered to ⅔ of that under the condition of same-frequency networking.

In the solution according to the embodiments of the invention, inter-cell interference can be lowered effectively for a Physical Control Format Indication Channel (PCFICH), a Physical Downlink Control Channel (PDCCH) and a Physical Hybrid Automatic Repeat Request (HARQ) Indication Channel (PHICH) occupying the entire system bandwidth. In particular, for other common channels, their occupied physical resources can be offset from each other in the frequency domain in this way to thereby obviate interference between the common channels effectively. For example, in FIG. 5 and FIG. 6, a Physical Broadcast Channel (PBCH), a Primary Synchronized Signal (PSS) and a Secondary Synchronization Signal (SSS) are located differently in the time domain and occupy six Physical Resource Blocks (PRBs) in the frequency band center in the frequency domain.

Figure 5:
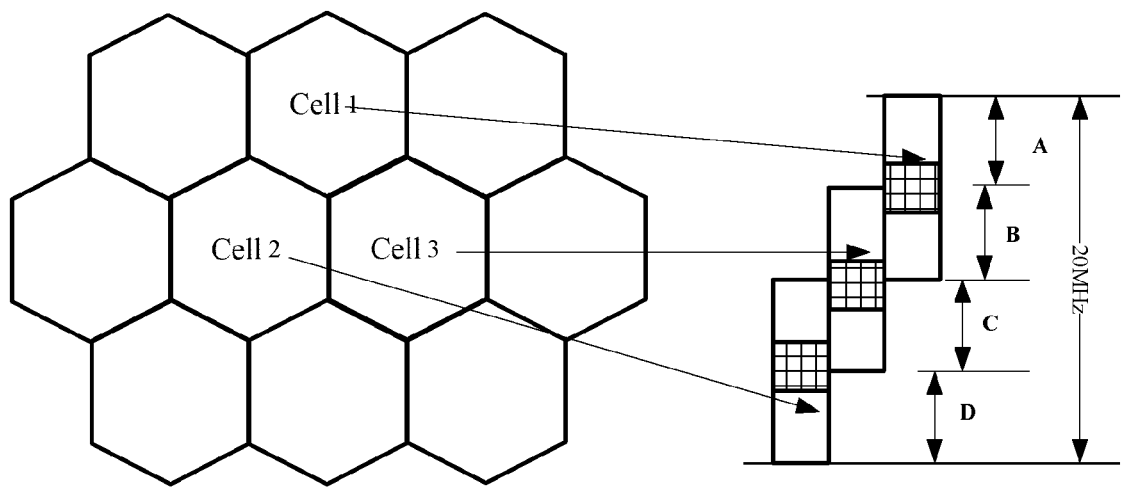
FIG. 5 is a schematic diagram of allocation of a downlink common channel according to an embodiment of the invention.

It can be seen from FIG. 5, in adjacent cells, offset from each other in the frequency domain is achieved by the determined sub-bands, and interference between channels can be lowered effectively as compared with the network deployment using a base station device with a system bandwidth of 20 MHz uniformly. The following description will be given by taking a PBCH as an example, and interference alleviation conditions of a PSS and an SSS are the same as that of the PBCH, so repeated descriptions thereof will be omitted later.

For the cell 1, in the frequency band A, interference is lowered to ⅓ of original interference; and in the frequency band B, interference is lowered to ⅔ of original interference.

For the cell 2, in the frequency band C, interference is lowered to ⅔ of original interference; and in the frequency band D, interference is lowered to ⅓ of original interference.

For the cell 3, in the frequency band B, interference is lowered to ⅔ of original interference; and in the frequency band C, interference is lowered to ⅔ of original interference.

Figure 6:
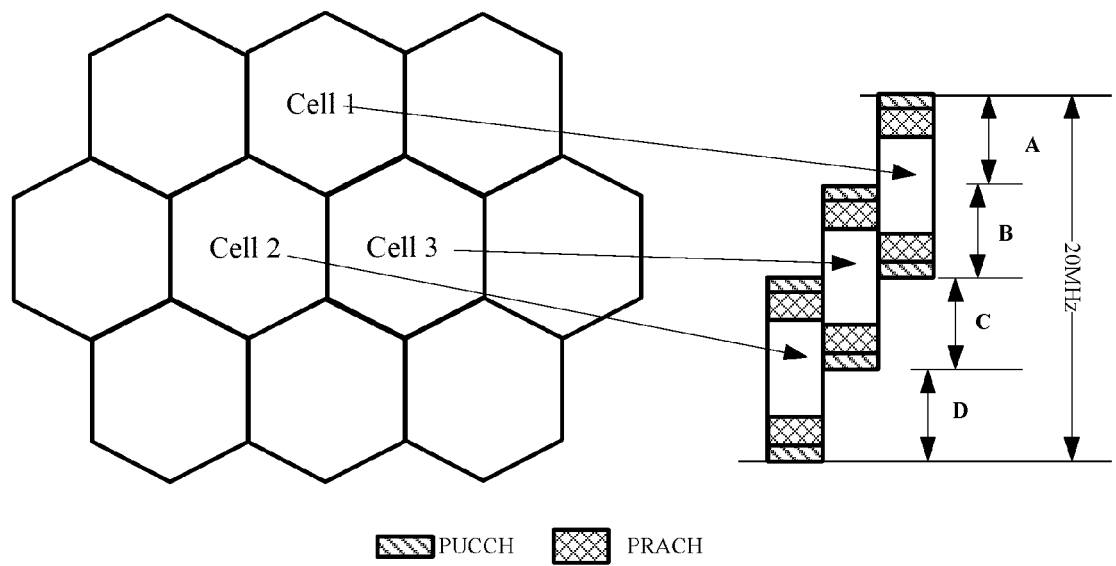
FIG. 6 is a schematic diagram of allocation of an uplink common channel according to an embodiment of the invention.

It can be seen from FIG. 6, with the determined sub-bands, positions, in the frequency domain, of a Physical Uplink Control Channel (PUCCH) and a Physical Random Access Channel (PRACH) are offset from each other in adjacent cells, thereby lowering interference between the channels effectively as compared with the network deployment using a base station device with a system bandwidth of 20 MHz uniformly. The following description will be given by taking a PUCCH as an example, and the interference alleviation condition of a PRACH is the same as that of the PUCCH, so a repeated description thereof will be omitted later.

For the cell 1, in the frequency band A, interference is lowered to ⅓ of original interference; and in the frequency band B, interference is lowered to ⅔ of original interference.

For the cell 2, in the frequency band C, interference is lowered to ⅔ of original interference; and in the frequency band D, interference is lowered to ⅓ of original interference.

For the cell 3, in the frequency band B, interference is lowered to ⅔ of original interference; and in the frequency band C, interference is lowered to ⅔ of original interference.

The embodiments of the invention will be further detailed below with reference to the drawings.

Figure 1:
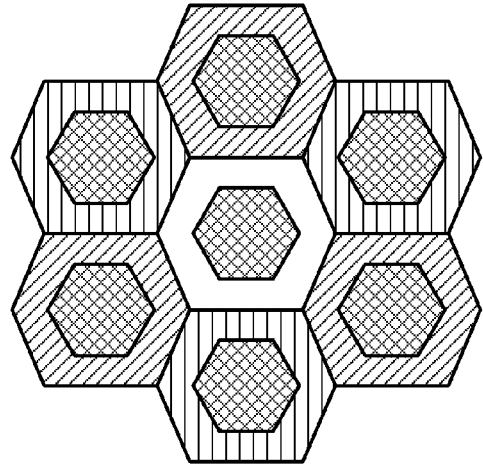
FIG. 1 is a schematic diagram of inter-cell interference coordination in the prior art.
Figure 1:
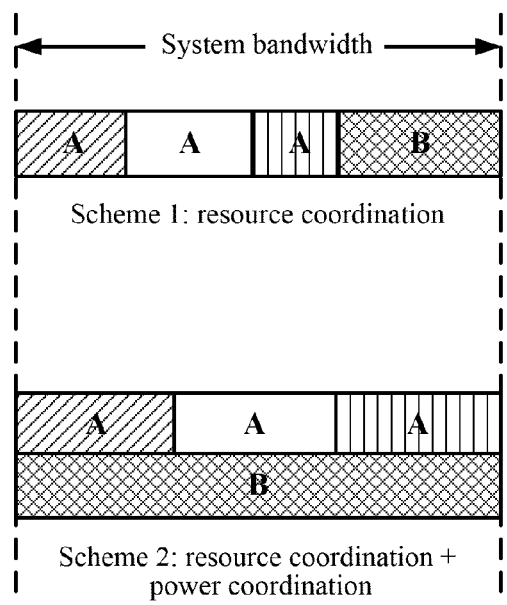
Figure 2:
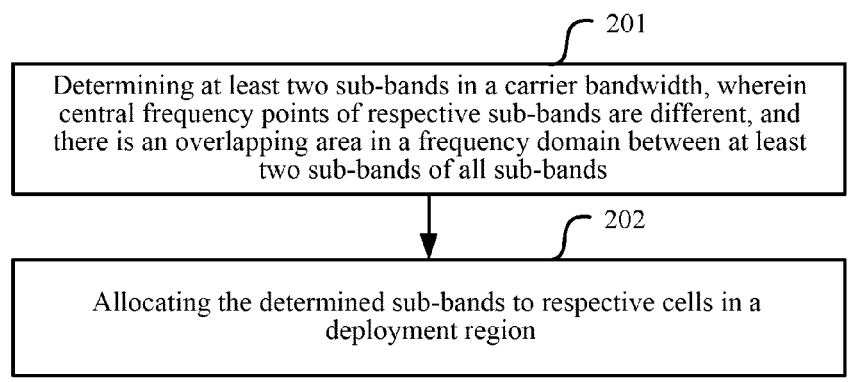
FIG. 2 is a schematic flow chart of a method for resource allocation according to an embodiment of the invention.

As illustrated in FIG. 2, a method for resource allocation according to an embodiment of the invention includes the following steps:

Step 201, determining at least two sub-bands in a carrier bandwidth, wherein central frequency points of respective sub-bands are different, and there is an overlapping area in a frequency domain between at least two sub-bands of all sub-bands.

Step 202, allocating the determined sub-bands to respective cells in a deployment region.

Furthermore, sub-bands allocated to a cell are taken as a system bandwidth of that cell.

Particularly, the carrier bandwidth can be larger than, equal to or smaller than the maximum bandwidth supported by a system, for example, the LTE system supports the maximum bandwidth of 20 MHz, so the carrier bandwidth can be larger than or smaller than or equal to 20 MHz. The width of each determined sub-band is preset and preferably equals to the system bandwidth supported by the system. For example, system bandwidths supported by the LTE system include 1.4 MHz, 3 MHz, 5 MHz, 10 MHz, 15 MHz and 20 MHz, so the width of each determined sub-band would be equal to one of the above values.

Particularly, all or a part of the determined respective sub-bands are identical in width, or any two of the determined sub-bands are different in width. Since a base station is configured according to the size of the system bandwidth, for example, the system bandwidth is 10 MHz and then a base station in support of 10 MHz need be configured, if there are a large number of base stations in support of different bandwidths, then there will be an increase in device type, inconvenience in maintenance and an increase in maintenance cost, so it is preferable that the widths of all the determined sub-bands are identical.

In an implementation, the number and the widths of the sub-bands can further be determined finally in combination of a specific network throughput demand and an interference condition. For example, a smaller number of sub-bands can be determined and the sub-bands can be wider (that is, more overlaps in the frequency domain) in the case of a higher throughput requirement and lower interference; and a larger number of sub-bands can be determined and the sub-bands can be narrower (that is, less overlaps in the frequency domain) in the case of a lower throughput requirement and serious interference.

In the step 201, when determining the sub-bands, the sub-bands can be further numbered in a descending or ascending order of central frequency points.

Correspondingly, in the step 202, when allocating the determined sub-bands to respective cells in a deployment region, sub-bands with consecutive serial numbers are allocated to cells nonadjacent in geographical location.

When determining the sub-bands, the overlapping area can be an area between sub-bands with consecutive serial numbers or an area between sub-bands with nonconsecutive serial numbers. Preferably, it is ensured that there is an overlapping area between at least one pair of sub-bands with consecutive serial numbers. In other words, if there is an overlapping area, then the overlapping area is an area between one pair of sub-bands with consecutive serial numbers; and if there are a plurality of overlapping areas, then each overlapping area can be an area between one pair of sub-bands with consecutive serial numbers, or a part of the overlapping areas can be areas between one pair of sub-bands with consecutive serial numbers.

When determining the sub-bands, there are at least six PRBs between central frequency points of sub-bands with consecutive serial numbers. Of course, the more PRBs there are between them, the higher the improvement in performance will be.

After the step 202, that can be further included:

A base station device consistent with the system bandwidth of the cell is selected to perform network deployment, and the deployed base station transmits and receives signals.

If there is an overlapping area across adjacent cells in a determined sub-band, then any cell (referred to as the current cell hereinafter) in the deployment region uses preferentially a frequency band, outside an overlapping area in frequency with other sub-bands, to transmit data, that is, uses preferentially frequency resources unused by the other sub-bands.

For the LTE system, the current cell uses preferentially a frequency band outside an overlapping area with other sub-bands and/or a frequency band unoccupied by a PBCH, a PUCCH and a PRACH to schedule data, thereby further lowering inter-cell interference.

For example, the current cell uses preferentially a frequency band outside the overlapping area with other sub-bands to schedule data; the current cell uses preferentially a frequency band unoccupied by the PBCH, the PUCCH and the PRACH to schedule data; or the current cell uses preferentially a frequency band outside the overlapping area with other sub-bands and unoccupied by the PBCH, the PUCCH and the PRACH to schedule data.

Some specific examples will be given below for the step 201 to further describe the solution of the invention.

Figure 7:
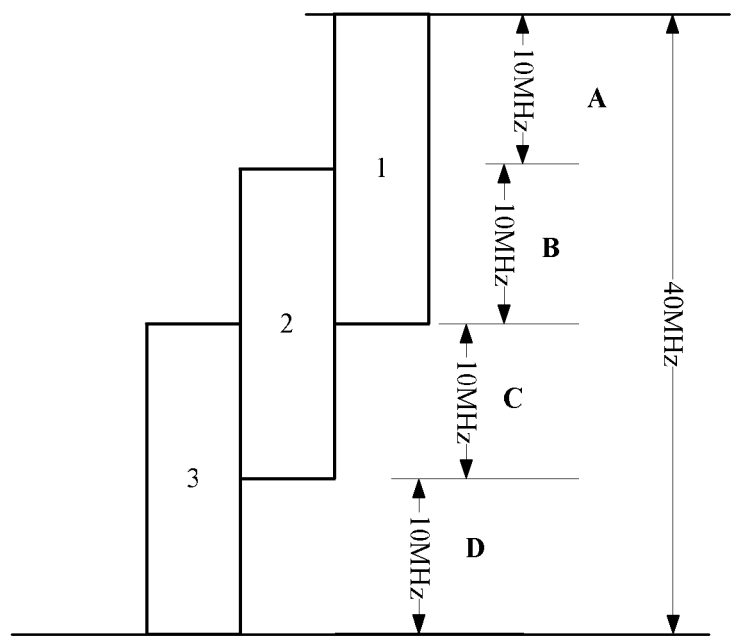
FIG. 7 is a schematic diagram of first carrier bandwidth allocation according to an embodiment of the invention.

Example 1: the carrier bandwidth is 40 MHz, and three sub-bands are determined with the same width of 20 MHz, where there is an overlapping area in the frequency domain between sub-bands with consecutive serial numbers, as illustrated in FIG. 7.

With this allocation scheme, there are overlapping areas of 10 MHz in the frequency domain between the sub-band 1 and the sub-band 2 and between the sub-band 2 and the sub-band 3, the width of each sub-band is 20 MHz, and the total carrier bandwidth is 40 MHz.

As compared with the network deployment using a base station device with a system bandwidth of 40 MHz uniformly:

in the frequency band A, interference is lowered to ⅓ of original interference;

in the frequency band B, interference is lowered to ⅔ of original interference;

in the frequency band C, interference is lowered to ⅔ of original interference; and in the frequency band D, interference is lowered to ⅓ of original interference.

Figure 8:
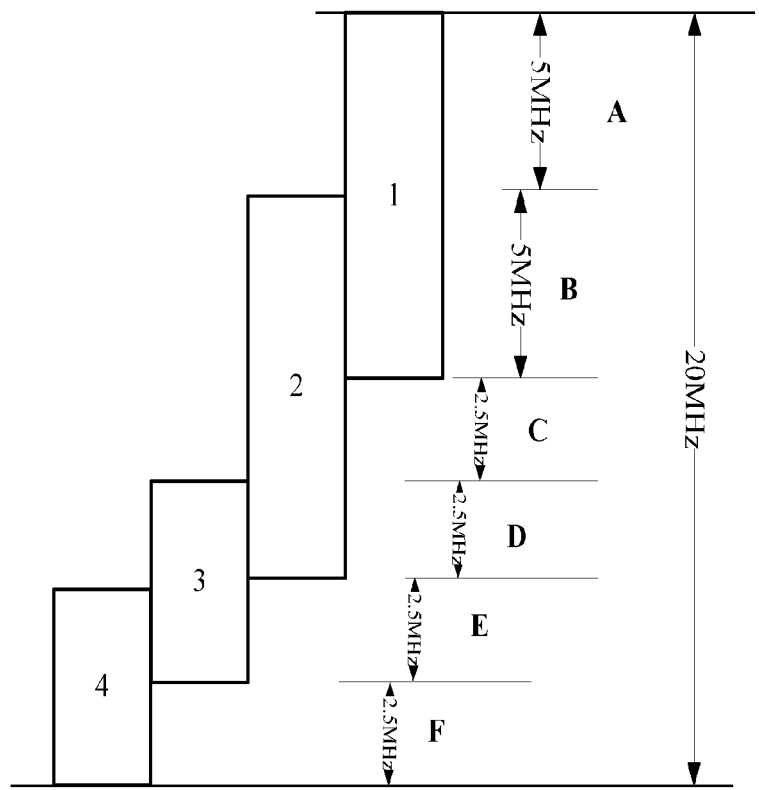
FIG. 8 is a schematic diagram of second carrier bandwidth allocation according to an embodiment of the invention.

Example 2: the carrier bandwidth is 20 MHz, and four sub-bands are determined with different widths, which are 10 MHz, 10 MHz, 5 MHz and 5 MHz respectively, where there is an overlapping area in the frequency domain between sub-bands with consecutive serial numbers, as illustrated in FIG. 8.

With this allocation scheme, the sub-bands are different in width, and there are different overlapping areas, of 5 MHz and 2.5 MHz respectively, in the frequency domain between sub-bands with consecutive serial numbers.

As compared with the network deployment using a base station device with a system bandwidth of 20 MHz uniformly:

in the frequency band A, interference is lowered to ¼ of original interference;

in the frequency band B, interference is lowered to ¾ of original interference;

in the frequency band C, interference is lowered to ¼ of original interference;

in the frequency band D, interference is lowered to ¾ of original interference;

in the frequency band E, interference is lowered to ¾ of original interference; and in the frequency band F, interference is lowered to ¼ of original interference.

Figure 9:
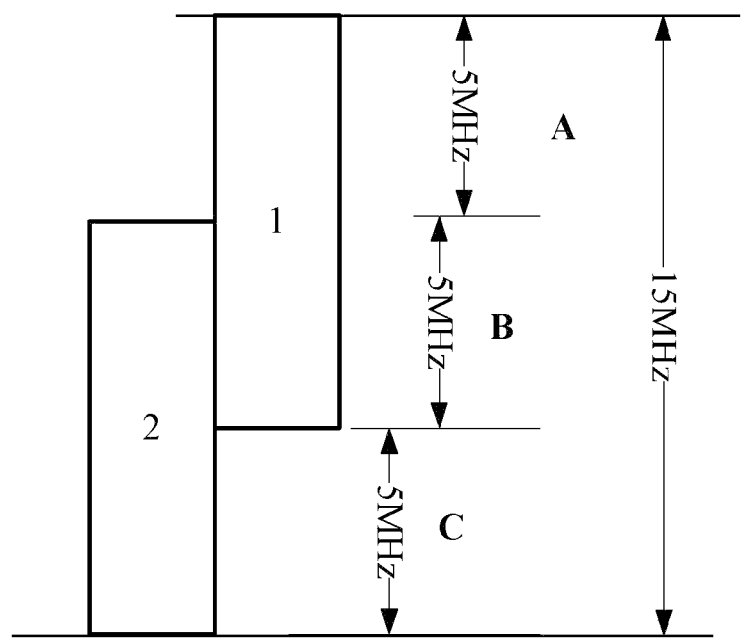
FIG. 9 is a schematic diagram of third carrier bandwidth allocation according to an embodiment of the invention.

Example 3: the carrier bandwidth is 15 MHz, and two sub-bands are determined with the same width of 10 MHz, where there is an overlapping area in the frequency domain between sub-bands with consecutive serial numbers, as illustrated in FIG. 9.

With this allocation scheme, the sub-bands are identical in width, and there is an overlapping area of 5 MHz in the frequency domain between sub-bands with consecutive serial numbers, the width of each sub-band is 10 MHz, and the total carrier bandwidth is 15 MHz.

As compared with the network deployment using a base station device with a system bandwidth of 15 MHz uniformly:

in the frequency band A, interference is lowered to ½ of original interference;

in the frequency band B, interference is not lowered; and in the frequency band C, interference is lowered to ½ of original interference.

Figure 10:
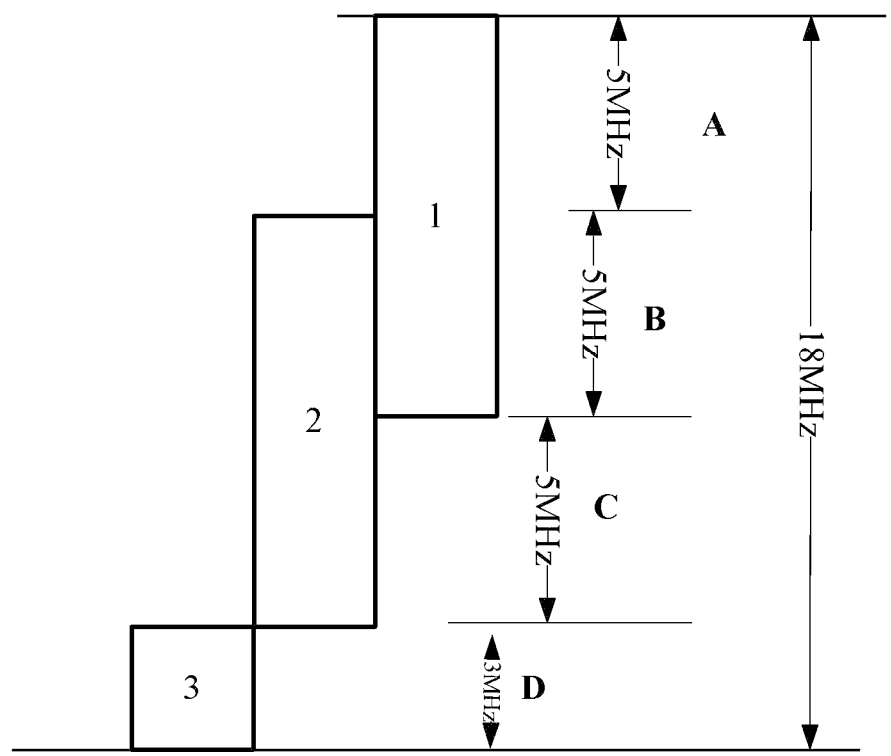
FIG. 10 is a schematic diagram of fourth carrier bandwidth allocation according to an embodiment of the invention.

Example 4: the carrier bandwidth is 18 MHz, and three sub-bands are determined with different widths, which are 10 MHz, 10 MHz and 3 MHz respectively, where there is an overlapping area in the frequency domain between the two sub-bands of 10 MHz with a total width of 15 MHz, and there is no overlapping area in the frequency domain between the sub-band of 3 MHz and the sub-band of 10 MHz, as illustrated in FIG. 10.

With this allocation scheme, the sub-band 1 and the sub-band 2 are identical in width and overlap in the frequency domain by 5 MHz, and the sub-band 3 has no overlapping area with the sub-band 2 and exclusively occupies a bandwidth of 3 MHz. The total carrier width is 18 MHz.

As compared with the network deployment using a base station device with a system bandwidth of 18 MHz uniformly:

in the frequency band A, interference is lowered to ⅓ of original interference;

in the frequency band B, interference is lowered to ⅔ of original interference;

in the frequency band C, interference is lowered to ⅓ of original interference; and in the frequency band D, interference is lowered to ⅓ of original interference.

Some specific examples will be given below for the step 202 to further describe the solution of the invention.

Figure 11:
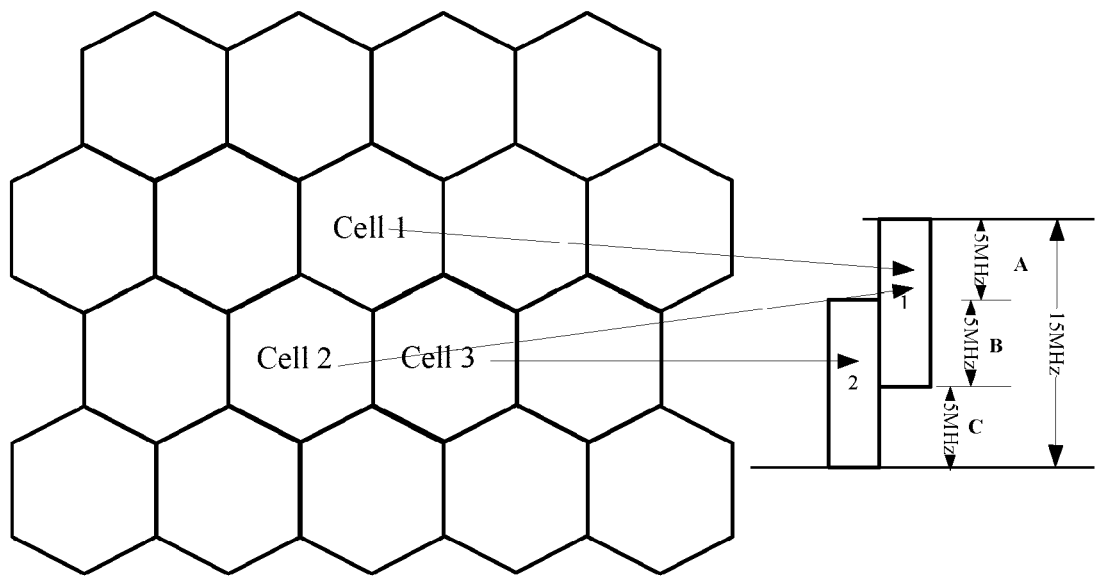
FIG. 11 is a schematic diagram of cell deployment of two sub-bands according to an embodiment of the invention.

Example 1: the number of sub-bands is 2, the carrier bandwidth is 15 MHz, the sub-bands are identical in width of 10 MHz, and there is an overlapping area in the frequency domain between sub-bands with consecutive serial numbers, as illustrated in FIG. 11.

As compared with the network deployment using a base station device with a system bandwidth of 15 MHz uniformly, different cells are subject to interferences which are changed differently:

For the cell 1, in the frequency band A, interference is lowered to ½ of original interference; and in the frequency band B, interference is not lowered.

For the cell 2, in the frequency band A, interference is lowered to ½ of original interference; and in the frequency band B, interference is not lowered.

For the cell 3, in the frequency band B, interference is not lowered; and in the frequency band C, interference is lowered to ½ of original interference.

Figure 12:
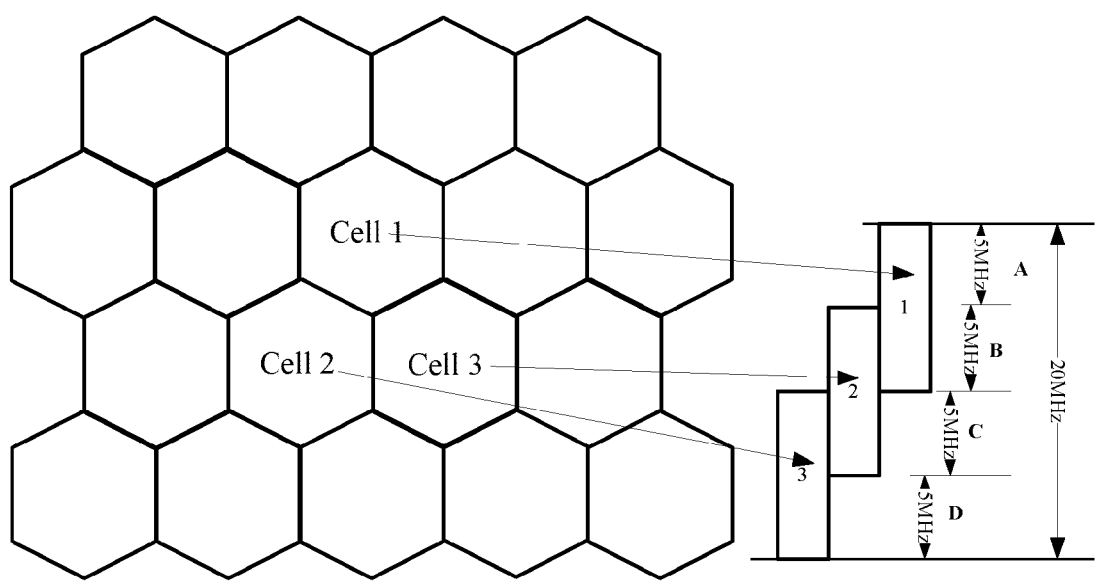
FIG. 12 is a schematic diagram of cell deployment of three sub-bands according to an embodiment of the invention.

Example 2: the number of sub-bands is 3, the carrier bandwidth is 20 MHz, the sub-bands are identical in width of 10 MHz, and there is an overlapping area in the frequency domain between sub-bands with consecutive serial numbers, as illustrated in FIG. 12.

As compared with the network deployment using a base station device with a system bandwidth of 20 MHz uniformly, different cells are subject to interferences which are all lowered:

For the cell 1, in the frequency band A, interference is lowered to ⅓ of original interference; and in the frequency band B, interference is lowered to ⅔ of original interference.

For the cell 2, in the frequency band C, interference is lowered to ⅔ of original interference; and in the frequency band D, interference is lowered to ⅓ of original interference.

For the cell 3, in the frequency band B, interference is lowered to ⅔ of original interference; and in the frequency band C, interference is lowered to ⅔ of original interference.

Figure 13:
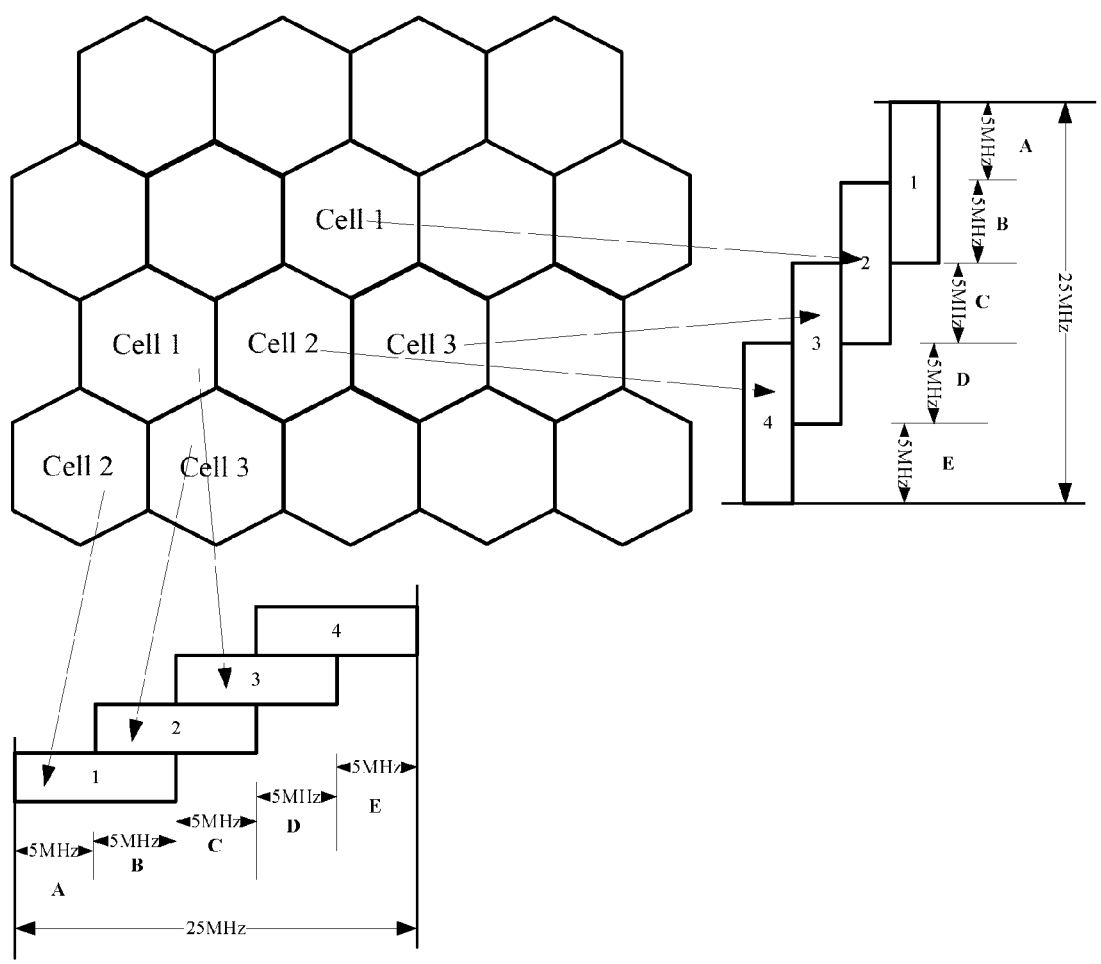
FIG. 13 is a schematic diagram of cell deployment of four sub-bands according to an embodiment of the invention.

Example 3: the number of sub-bands is 4, the carrier bandwidth is 25 MHz, the sub-bands are identical in width of 10 MHz, and there is an overlapping area in the frequency domain between sub-bands with consecutive serial numbers, as illustrated in FIG. 13.

There are generally four cell deployment schemes for the four sub-bands: in the first scheme, the sub-bands configured for the cell are inconsecutive and have a non-overlapping area therebetween; in the second scheme, the sub-bands configured for the cell are consecutive and have an overlapping area therebetween; in the third scheme, the sub-bands configured for the cell are inconsecutive and have an overlapping area therebetween; and in the fourth scheme, the sub-bands configured for the cell are consecutive and have a non-overlapping area therebetween.

As compared with the network deployment using a base station device with a system bandwidth of 25 MHz uniformly, different cells are subject to interferences which are lowered differently:

In the first scheme, adjacent cells are configured with inconsecutive sub-bands:

For the cell 1, in the frequency band A, interference is lowered to ⅓ of original interference; and in the frequency band B, interference is lowered to ⅓ of original interference.

For the cell 2, in the frequency band E, interference is lowered to ⅓ of original interference; and in the frequency band D, interference is lowered to ⅔ of original interference.

For the cell 3, in the frequency band C, interference is lowered to ⅓ of original interference; and in the frequency band D, interference is lowered to ⅔ of original interference.

In the second scheme, adjacent cells are configured with consecutive sub-bands:

For the cell 1, in the frequency band C, interference is lowered to ⅔ of original interference; and in the frequency band D, interference is lowered to ⅓ of original interference.

For the cell 2, in the frequency band A, interference is lowered to ⅓ of original interference; and in the frequency band B, interference is lowered to ⅔ of original interference.

For the cell 3, in the frequency band B, interference is lowered to ⅔ of original interference; and in the frequency band C, interference is lowered to ⅔ of original interference.

The third and fourth schemes are similar to the foregoing two schemes, and repeated descriptions thereof will be omitted here.

Based upon the same inventive idea, an embodiment of the invention further provides a device for resource allocation, and since the device for resource allocation addresses the problems under a similar principle to the method for resource allocation, reference can be made to the implementations of the method for implementations of the device for resource allocation, and a repeated description thereof will be omitted here.

Figure 3:
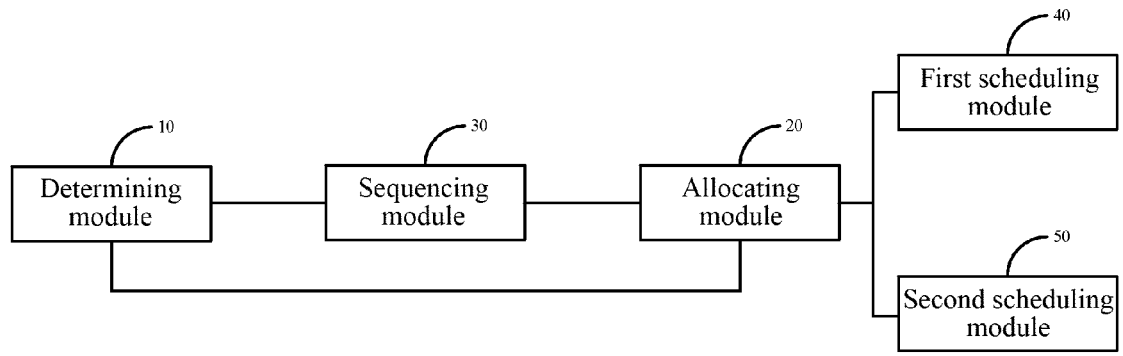
FIG. 3 is a schematic structural diagram of a device for resource allocation according to an embodiment of the invention.

As illustrated in FIG. 3, the device for resource allocation according to the embodiment of the invention includes a determining module 10 and an allocating module 20.

The determining module 10 is configured to determine at least two sub-bands in a carrier bandwidth, wherein central frequency points of respective sub-bands are different, and there is an overlapping area in a frequency domain between at least two sub-bands of all sub-bands.

The allocating module 20 is configured to allocate the determined sub-bands to respective cells in a deployment region, wherein sub-bands allocated to a cell are taken as a system bandwidth of that cell.

All or a part of the respective sub-bands determined by the determining module 10 are identical in width, or any two of the sub-bands determined by the determining module 10 are different in width.

Particularly, the device for resource allocation according to the embodiment of the invention can further include a sequencing module 30.

The sequencing module 30 is configured to number the sub-bands in a descending or ascending order of their central frequency points.

Correspondingly, the allocating module 20 allocates sub-bands with consecutive serial numbers to cells nonadjacent in geographical location.

Preferably, there is an overlapping area between at least one pair of sub-bands with consecutive serial numbers determined by the determining module.

There are at least six Physical Resource Blocks (PRBs) between central frequency points of sub-bands with consecutive serial numbers determined by the determining module.

Particularly, the device for resource allocation according to the embodiment of the invention can further include a first scheduling module 40.

The first scheduling module 40 is configured to transmit data in a current cell preferentially in a frequency band outside an overlapping area in frequency with other sub-bands.

If the device for resource allocation according to the embodiment of the invention is applied to the LTE system, the device can further include a second scheduling module 50.

The second scheduling module 50 is configured to schedule data in a current cell preferentially in a frequency band outside an overlapping area with other sub-bands and/or in a frequency band unoccupied by a PBCH, a PUCCH and a PRACH.

Particularly, the width of each sub-band determined by the determining module 10 is preset.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Since central frequency points of respective determined sub-bands are different, there is an overlapping area in the frequency domain between at least two sub-bands of all the sub-bands, and the sum of the bandwidth of the overlapping area and the bandwidth of an non-overlapping area is no larger than the carrier bandwidth, inter-cell interference can be lowered effectively for a PCFICH, a PDCCH and a PHICH occupying the entire system bandwidth. Especially for a PBCH, a PSS/SSS, a PRACH and a PUCCH, their occupied physical resources are offset from each other in the frequency domain to thereby obviate interference between the common channels effectively. Moreover, it is not necessary to limit transmission power, thus lowering hardware costs of the base station and power consumption, and saving wasted resources; and furthermore, costs of network deployment can not be increased.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore, the invention can be embodied in the form of a computer program product embodied in one or more computer useable storage mediums (including but not limited to a disk memory, a CD-ROM, an optical memory, etc.) in which computer useable program codes are contained.

The invention has been described with reference to flow charts and/or block diagrams of the method, the device (system) and the computer program product according to the embodiments of the invention. It shall be appreciated that respective flows and/or blocks in the flow charts and/or the block diagrams and combinations of the flows and/or the blocks in the flow charts and/or the block diagrams can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow charts and/or the block(s) of the block diagrams.

These computer program instructions can also be stored into a computer readable memory capable of directing the computer or the other programmable data processing device to operate in a specific manner so that the instructions stored in the computer readable memory create manufactures including instruction means which perform the functions specified in the flow(s) of the flow charts and/or the block(s) of the block diagrams.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow charts and/or the block(s) of the block diagrams.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as these modifications and variations come into the scope of the claims appended to the invention and their equivalents.

The invention claimed is:

1. A method for resource allocation, comprising:
   determining at least two sub-bands in a carrier bandwidth, wherein central frequency points of respective sub-bands are different, and there is an overlapping area in a frequency domain between at least two sub-bands of all sub-bands; and
   allocating the determined sub-bands to respective cells in a deployment region, wherein each of the sub-bands is allocated to a respective cell and taken as a system bandwidth of that cell, the system bandwidth of that cell comprising all frequency resources of sub-bands allocated to that cell;
   wherein determining at least two sub-bands in the carrier bandwidth includes having at least six Physical Resource Blocks, PRBs, between central frequency points of sub-bands with consecutive serial numbers.

2. The method according to claim 1, wherein all or a part of the respective sub-bands determined in the carrier bandwidth are identical in width, or any two of the sub-bands determined in the carrier bandwidth are different in width.

3. The method according to claim 1, wherein when determining at least two sub-bands in the carrier bandwidth, numbering the sub-bands in a descending or ascending order of their central frequency points.

4. The method according to claim 3, wherein allocating the determined sub-bands to the respective cells in the deployment region comprises:
   allocating sub-bands with consecutive serial numbers to cells nonadjacent in geographical location.

5. The method according to claim 3, wherein when determining at least two sub-bands in the carrier bandwidth, the method further comprises: having an overlapping area between at least one pair of sub-bands with consecutive serial numbers.

6. The method according to claim 3, wherein any cell in the deployment region uses preferentially a frequency band, outside an overlapping area in frequency with other sub-bands, to transmit data.

7. The method according to claim 3, wherein when the method is applied to an LTE system, any cell in the deployment region uses preferentially a frequency band outside an overlapping area with other sub-bands and/or a frequency band unoccupied by a Physical Broadcast Channel, PBCH, a Physical Uplink Control Channel, PUCCH, and a Physical Random Access Channel, PRACH, to schedule data.

8. The method according to claim 1, wherein the width in the frequency domain of each sub-band determined is preset.

9. A device for resource allocation, comprising:
   a determining module configured to determine at least two sub-bands in a carrier bandwidth, wherein central frequency points of respective sub-bands are different, and there is an overlapping area in a frequency domain between at least two sub-bands of all sub-bands; and
   an allocating module configured to allocate the determined sub-bands to respective cells in a deployment region, wherein each of the sub-bands is allocated to a respective cell and taken as a system bandwidth of that cell, the system bandwidth of that cell comprising all frequency resources of sub-bands allocated to that cell;

wherein there are at least six Physical Resource Blocks, PRBs, between central frequency points of sub-bands with consecutive serial numbers determined in the carrier bandwidth by the determining module.

10. The device according to claim 9, wherein all or a part of the respective sub-bands determined in the carrier bandwidth by the determining module are identical in width, or any two of the sub-bands determined in the carrier bandwidth by the determining module are different in width.

11. The device according to claim 9, further comprising:
a sequencing module configured to number the sub-bands in a descending or ascending order of their central frequency points when determining at least two sub-bands in the carrier bandwidth.

12. The device according to claim 11, wherein the allocating module is specifically configured to:
allocate sub-bands with consecutive serial numbers to cells nonadjacent in geographical location.

13. The device according to claim 11, wherein there is an overlapping area between at least one pair of sub-bands with consecutive serial numbers determined in the carrier bandwidth by the determining module.

14. The device according to claim 11, further comprising:
a first scheduling module configured to transmit data in any cell in the deployment region preferentially in a frequency band outside an overlapping area in frequency with other sub-bands.

15. The device according to claim 11, wherein when the device is applied to an LTE system, the device further comprises:
a second scheduling module configured to schedule data in any cell in the deployment region preferentially in a frequency band outside an overlapping area with other sub-bands and/or in a frequency band unoccupied by a Physical Broadcast Channel, PBCH, a Physical Uplink Control Channel, PUCCH, and a Physical Random Access Channel, PRACH.

16. The device according to claim 9, wherein the width in the frequency domain of each sub-band determined by the determining module is preset.

* * * * *